United States Patent
Kuroki

[11] 4,253,306
[45] Mar. 3, 1981

[54] MASTER CYLINDER
[75] Inventor: Tadashi Kuroki, Yokohama, Japan
[73] Assignee: Nissan Motor Company, Limited, Yokohama, Japan
[21] Appl. No.: 10,919
[22] Filed: Feb. 9, 1979
[30] Foreign Application Priority Data
Mar. 30, 1978 [JP] Japan .................. 53/37123
[51] Int. Cl.³ .............................. B60T 11/06
[52] U.S. Cl. .......................... 60/561; 60/562; 60/576; 60/591
[58] Field of Search ............. 60/574, 575, 576, 578, 60/581, 591, 561, 562; 303/6 C
[56] References Cited
U.S. PATENT DOCUMENTS
2,666,294  1/1954  Porter ..................... 60/576
2,820,347  1/1958  Highland .................. 60/578
3,143,860  8/1964  Stelzer .................... 60/576

FOREIGN PATENT DOCUMENTS
1061352  3/1967  United Kingdom.

Primary Examiner—Abraham Hershkovitz

[57] ABSTRACT

A master cylinder for a hydraulic brake system of an automotive vehicle having front and rear sets of brake cylinders is disclosed, in which during the application of brake pressure above a predetermined value at which modulation and reduction of the rate at which pressure is fed to the rear brake cylinders occurs, the rate at which pressure is fed to the front brake cylinder is increased as compared with the rate before the modulation point.

3 Claims, 3 Drawing Figures

MASTER CYLINDER

BACKGROUND OF THE INVENTION

The present invention relates to a master cylinder for use in a hydraulic brake system including front and rear sets of brake cylinders.

As is well known in the art, in vehicles such as automobiles, hydraulic brake systems are widely used in which the brake pressure supply is divided into two independent circuits so that even if one of the circuits fails or malfunctions the vehicle can be safely braked by the other circuit.

In a known hydraulic brake system of this type, one of two circuits supplies a master cylinder pressure from one outlet port of a master cylinder to the front wheel brake cylinders of a vehicle while the other circuit supplies the master cylinder pressure from the other outlet port of the master cylinder to the rear wheel brake cylinders of the vehicle.

On the other hand, since the weight of a vehicle acting on the rear wheels is reduced by the so-called nose-dive phenomenon during braking, it is necessary to reduce the brake pressure supplied to the rear wheel brake cylinders to prevent locking or skidding of the rear wheels. For solving this problem, in the conventional hydraulic brake system, a brake pressure control device is disposed between the master cylinder and the rear brake cylinders which serves to reduce or limit the rear wheel brake pressure relatively to the front wheel brake pressure. However, the conventional hydraulic brake system suffers from the drawbacks that the brake pressure control device is expensive and the installation and piping of the brake pressure control device are troublesome and time consuming.

The conventional hydraulic control system also suffers from the following drawback or disadvantage: The front wheel brake cylinders connected directly to the master cylinder are fed with a brake pressure proportional to a force depressing the brake pedal of the vehicle as shown by the line a-b-d in FIG. 2 of the accompanying drawings. On the other hand, although the rear wheel brake cylinders connected to the master cylinder by way of the brake pressure control device are fed with a brake pressure shown by the line a-b in FIG. 2 which is proportional to the brake pedal depressing force when the brake pedal depressing force is below a predetermined value $F_1$, the rear wheel brake cylinders are fed with a modulated brake pressure shown by the line b-e in FIG. 2 which is increased at a lower rate than the rate of increase in the front wheel brake pressure b-d with respect to the increase in the brake pedal depressing force upon the brake pedal being depressed with a force above the predetermined value $F_1$. Accordingly, since the total braking force (viz. the sum of a-b-d and a-b-e) is indicated by the line a-g-h (FIG. 2) the rate at which the braking force increases with respect to the increase in the brake pedal depressing force tapers off after the modulation point (which occurs upon the brake pedal being depressed with the afore mentioned force $F_1$). Hence to achieve a given degree of braking after the modulation point the driver must exert a disproportionately large amount of force on the brake pedal due to the modulation of the pressure fed to the rear wheels.

SUMMARY OF THE INVENTION

It is therefore an object of the invention to provide a master cylinder which is simple and cheap to produce and which enables the reduction of the work necessary to install it and the associated piping in the vehicle.

It is another object of the present invention to provide a master cylinder which increases the front wheel pressure at a rate which is greater than the corresponding rate of increase in the conventional hydraulic brake system to compensate for the modulation of the rear wheel pressure.

According to the invention, there is provided a master cylinder for an automotive vehicle having a brake pedal and front and rear sets of brake cylinders, comprising: a housing having a blind stepped bore formed therein and a reservoir for hydraulic fluid in fluid communication with the stepped bore, the stepped bore having a large diameter bore section leading from the open end of the stepped bore and a small diameter portion leading from the large diameter bore section to the end wall of the stepped bore; a first stepped piston slidably received in the stepped bore, the first piston having a small diameter portion and a large diameter portion; a second piston slidably received in the large diameter bore portion and closing the stepped bore, the second piston being operatively connected to the brake pedal so as to be urged toward the first piston via depression of the brake pedal; the first and second pistons defining in the stepped bore first, second and third variable volume chambers; the first chamber being defined in the large diameter bore section between the first and second pistons; the second chamber being defined in the large diameter bore section between the step of the first piston between the large and small diameter portions and the shoulder of the stepped bore between the large and small diameter sections; and the third chamber being defined in the small diameter bore section between the end of the stepped bore and the end of the small diameter portion of the first piston; first and second biasing means disposed respectively in the large diameter bore portion between the first and second pistons and in the small diameter bore portion between the small diameter portion of the first piston and the end of the stepped bore; passage means formed in the first piston for providing fluid communication between the first and second chambers; and valve means for obstructing the passage means to prevent fluid communication between the first and second chambers upon a pressure greater than a predetermined value prevailing in the third chamber.

BRIEF DESCRIPTION OF THE DRAWINGS

These and other features and advantages of the invention will become more apparent from the following detailed description taken in connection with the accompanying drawings in which.

DESCRIPTION OF THE PREFERRED EMBODIMENT

Figure 1:
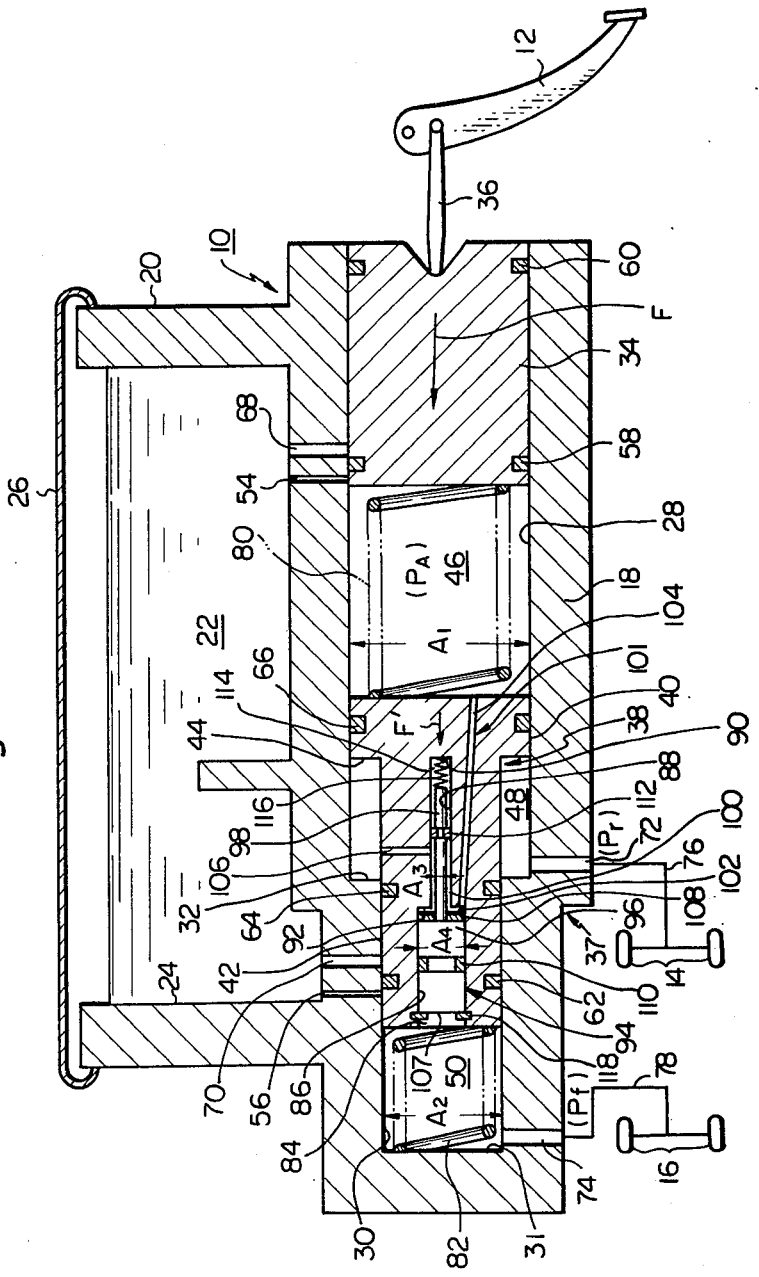
FIG. 1 is a schematic view of a preferred embodiment of a master cylinder according to the invention.
Figure 2:
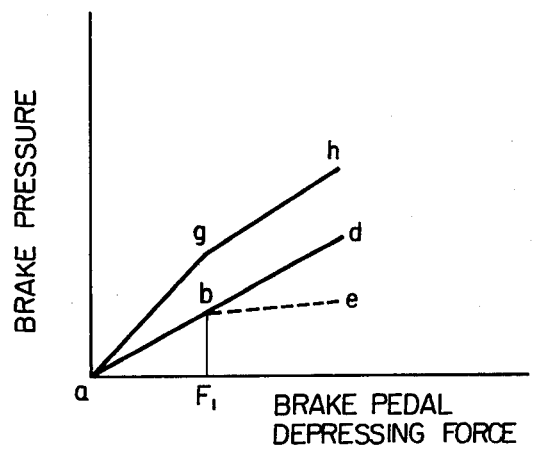
FIG. 2 is a graphic representation of the relationship between the front and rear wheel brake pressures and the brake pedal depressing force in the conventional hydraulic brake system as per the introduction of the present specification.

Referring to FIG. 1 of the drawings, there is shown a master cylinder according to the invention. The master cylinder, generally designated by the numeral reference 10, is combined with a vehicular hydraulic brake system including a brake pedal 12, a set of rear wheel brake cylinders 14 and a set of front wheel brake cylinders 16. The master cylinder 10 comprises a housing or body 18 including at its upper portion a reservoir 20 formed integrally with the housing 18 for storing hydraulic fluid 22. The reservoir 20 has at its upper portion an inlet opening 24 covered by a detachable closure member 26.

The housing 18 is formed therein with a stepped diameter bore including a large diameter bore section 28 and a small diameter bore section 30 coaxial with the bore section 28. The bore section 30 is closed at one end by an end wall 31. An annular step or shoulder 32 is formed to interconnect the large and small diameter bore sections 28 and 30. A power piston 34 is slidably fitted in the large diameter bore section 28 and is operatively connected to the brake pedal 12 by, for example, a push rod 36. A stepped diameter piston 38 has a large diameter portion 40 slidably fitted in the large diameter bore section 28 and a small diameter portion 42 slidably fitted in the small diameter bore section 30. An annular step or shoulder 44 is formed between the large and small diameter portions 40 and 42. A first hydraulic fluid chamber 46 is defined in the large diameter portion 28 of the stepped bore between the power piston 34 and the larger diameter portion 40 of the stepped diameter piston 38. A second hydraulic fluid chamber 48 is defined in the large diameter portion 28 between the step 32 of the housing 18 and the step 44 of the stepped diameter piston 38. A third hydraulic fluid chamber 50 is defined in the small diameter portion 30 between the small diameter portion 42 of the stepped diameter piston 38 and the end wall 31 of the small diameter bore 30. The first and third hydraulic chambers 46 and 50 are communicable with the reservoir 20 by first and second inlet openings 54 and 56 formed through the surrounding walls of the large and small diameter bores 28 and 30, respectively. A pair of sealing members 58 and 60 such as O rings are carried by the power piston 34 and engage the wall of the large diameter bore 28 to prevent the flow of fluid therepast. When the brake pedal 12 is not depressed, the sealing member 58 is positioned outboard of the inlet opening 54 with respect to the first hydraulic chamber 46 as shown in FIG. 1 so that the first hydraulic chamber 46 communicates with the reservoir 20 by way of the inlet opening 54 and a clearance (not shown) between the wall of the large diameter bore 28 and the power piston 34. Sealing members 62, 64 and 66 such as O rings are positioned on the stepped diameter piston 38 and engage the walls of the large and small diameter bores 28 and 30 and prevent the flow of fluid therepast. When the brake pedal 12 is not depressed, the sealing member 62 is positioned outboard of the inlet opening 56 with respect to the third hydraulic chamber 50 as shown in FIG. 1 so that the third hydraulic chamber 50 communicates with the reservoir 20 by way of the inlet opening 56 and a clearance (not shown) between the wall of the small diameter bore 30 and the small diameter portion 42. A passage 68 is formed through the wall of the large diameter bore 28 and communicates the reservoir 20 with the large diameter bore 28 between the sealing members 58 and 60 to maintain the pressure of the fluid in the bore 28 therebetween, at ambient atmospheric pressure. A passage 70 is formed through the wall of the small diameter bore 30 and communicates the reservoir 20 with the small diameter bore 30 between the sealing members 62 and 64 to maintain the pressure of the fluid in the bore 30 therebetween, at ambient atmospheric pressure. Outlet passages 72 and 74 are formed respectively through the walls of the large and small diameter bores 28 and 30. The second hydraulic chamber 48 is connected to the rear wheel brake cylinders 14 by way of the outlet passage 72 and a conduit 76, while the third hydraulic chamber 50 is connected to the front wheel brake cylinders 16 by way of the outlet passage 74 and a conduit 78. A spring 80 is disposed in the first hydraulic chamber 46 and urges the power piston 34 and the stepped diameter piston 38 in opposite directions. A spring 82 is disposed in the third hydraulic chamber 50 and urges the stepped diameter piston 38 toward the power piston 34.

The stepped diameter piston 38 is formed therein with a stepped diameter bore 84 including a large diameter bore 86 opening into the third hydraulic chamber 50 and a small diameter bore 88 opening at one end into the large diameter bore 86 and closed at the other end by an end wall 90. An annular step or shoulder 92 is formed between the large and small diameter bores 86 and 88 and serves as a valve seat as will be described hereafter. A stepped diameter plunger 94 is disposed in the stepped diameter bore 84 and includes a large diameter portion 96 slidably fitted in the large diameter bore 86 and a small diameter portion 98 secured to the large diameter portion 96 and extending into the small diameter bore 88. The small diameter portion 98 has a diameter smaller than that of the small diameter bore 88 so that a clearance 100 is defined between the small diameter portion 98 and the surrounding wall of the small diameter bore 88. Passage means generally denoted by the reference numeral 101 is provided for providing communication between the first and second hydraulic chambers 46 and 48. The passage means 101 comprises the clearance 100, a space 102 between the valve seat 92 and the large diameter portion 96, a passage 104 formed in the stepped diameter piston 38 and providing communication between the first hydraulic chamber 46 and the space 102, and a passage 106 formed in the small diameter portion 42 of the piston 38 and providing communication between the second hydraulic chamber 48 and the clearance 100. The large diameter portion 96 has an end portion 107 exposed to the third hydraulic chamber 50 to receive the pressure of hydraulic fluid thereagainst which urges the plunger 94 rightwards in the drawing. The large diameter portion 96 serves as a control valve cooperating with the valve seat 92 which opens and closes the passage means 101 to permit and obstruct communication between the first and second hydraulic chambers 46 and 48 in response to hydraulic fluid pressures in the third hydraulic chamber 50 below and above a predetermined value. In order to secure the closure of the passage means 101 by the large diameter portion 96, a valve seal 108 is secured to a shoulder of the large diameter portion 96. The valve seal 108 is engaged against and disengaged from the valve seat 92 when the large diameter portion 96 closes and opens the passage means 101, respectively. A sealing member 110 such as an O ring carried by the large diameter portion 96 engages the wall of the large diameter bore 86 and prevents the flow of fluid therepast. A sealing member 112 carried by the small diameter portion 98 engages the wall of the small diameter bore 88 and separates a space 114 between an end of the small diameter portion 98 and the end wall 90 of the small diameter bore 88 from the clearance 100 and the passage 106. A spring 116 is disposed in the space 114 and urges the plunger 94 in a left-hand direction in the drawing in which the large diameter portion 96 opens the passage means 101. A stop 118 is carried by the wall of the large diameter bore 86 and limits movement of the plunger 94 in the left-hand direction.

The master cylinder 10 thus described operates in the following manner.

The master cylinder 10 shown in FIG. 1 is in a brake unapplied condition in which the brake pedal 12 is not depressed. Thus, when the brake pedal 12 is depressed, the power piston 34 and the stepped diameter piston 38 are moved leftwards in the drawing in opposition to the forces of the springs 80 and 82, respectively. When the sealing members 58 and 62 pass the inlet openings 54 and 56 to obstruct communication between the reservoir 20 and the first hydraulic chamber 46 and communication between the reservoir 20 and the third hydraulic chamber 50 respectively, hydraulic fluid is forced from the second hydraulic chamber 48 to the rear wheel brake cylinders 14 and from the third hydraulic chamber 50 to the front wheel brake cylinders 16 to move shoes to drums or move pads to discs when the brakes of the vehicle are, for example, drum brakes or disc brakes, respectively. When the shoes are pressed against the drums or the pads are pressed against the discs, hydraulic fluid pressures $P_A$, $P_r$ and $P_f$ are produced respectively in the first, second and third hydraulic chambers 46, 48 and 50. Assuming F to be a force depressing the brake pedal 12, and $A_1$ to be the pressure receiving surface area or the effective surface area of each of the power piston 34 and the large diameter portion 40 of the stepped diameter piston 38, the hydraulic fluid pressure $P_A$ (master cylinder pressure) is defined as $$P_A = F/A_1 \quad (1)$$

At this time, since the plunger 94 is in the position shown in FIG. 1 in which the large diameter portion 96 opens the passage means 101 to permit communication between the first and second hydraulic chambers 46 and 48, the hydraulic fluid pressure $P_A$ in the first hydraulic chamber 46 is fed into the second hydraulic chamber 48 by way of the passage 104, the space 102, the clearance 100 and the passage 106. Accordingly, the hydraulic fluid pressure $P_r$ (rear wheel brake pressure) in the second hydraulic chamber 48 is defined as $$P_r = P_A = (F/A_1) \quad (2)$$

A force F' pushing the stepped diameter piston 38 leftwards in the drawing is represented by the difference between the force exerted on the stepped diameter piston 38 leftwards by the hydraulic fluid pressure $P_A$ in the first hydraulic chamber 46 and the force exerted on the stepped diameter piston 38 rightwards by the hydraulic fluid pressure $P_r$ in the second hydraulic chamber 48. Accordingly, assuming $A_2$ to be the effective surface area of the small diameter portion 42 of the stepped diameter piston 38, the force F' is represented by the following expression:

$$F' = P_A \cdot A_1 - P_r(A_1 - A_2)$$

Since $P_r = P_A$ from the equation (2), $$F' = P_A \cdot A_2 \quad (3)$$

Next, the hydraulic fluid pressure $P_f$ (front wheel brake pressure) in the third hydraulic chamber 50 is expressed by the following formula;

$$P_f = (F'/A_2)$$

Combining this equation with the equation (3) gives $$P_f = P_A$$

As is apparent from the description as to the operation taken above, in so far as the plunger 94 opens the passage means 101, the front and rear wheel brake pressures $P_f$ and $P_r$ become equal to the hydraulic fluid pressure $P_A$ in the first hydraulic chamber 46, this is, $$P_f = P_r = P_A = (F/A_1) \quad (4)$$

When the brake pedal depressing force F is increased, the plunger 94 closes the passage means 101 in the following manner. Assuming $F_s$ to be the force of the spring 116, $A_3$ to be the cross sectional area of the small diameter portion 98 of the plunger 94, and $A_4$ to be the effective surface area of the large diameter portion 96 of the plunger 94, when the large diameter portion 96 opens the passage means 101, the following equation indicates the relationship of the forces acting on the plunger 94 which are in equilibrium:

$$P_f A_4 = P_r(A_4 - A_3) + F_s \quad (5)$$

Since $P_f = P_r$ from the equation (4), $$P_f A_4 = P_f(A_4 - A_3) + F_s$$

Therefore $$P_f = (F_s/A_3) \text{ or } P_r = (F_s/A_3)$$

These hydraulic fluid pressures $P_f$ and $P_r$ are critical values or the highest values at which the plunger 94 can open the passage means 101. When the depressing force F of the brake pedal 12 is above a predetermined value $F_o$ at which the hydraulic fluid pressures $P_f$ and $P_r$ are at the critical values, the plunger 94 closes the passage means 101 to obstruct communication between the first and second hydraulic chambers 46 and 48.

When the plunger 94 closes the passage means 101, the plunger 94 effectively loses the surface receiving the hydraulic fluid pressure $P_r$ in the hydraulic chamber 48, that is, the term $P_r(A_4 - A_3)$ of the equation (5) becomes zero. Accordingly, when the plunger 94 is moved into a closed position in which it closes the passage means 101, it is maintained at the closed position, unless $P_f A_4 < F_s$. When the hydraulic fluid pressure $P_f$ is increased as the brake pedal depressing force F is increased when the plunger 94 closes the passage means 101, since the plunger 94 can move no further to the right in the drawing from the closed position the spring 116 is not compressed any further and the force $F_s$ of the spring 116 is not increased. Accordingly, the condition that $P_f A_4 > F_s$ is maintained. Therefore, the plunger 94 is maintained at the closed position.

When the brake pedal depressing force F is increased above the value $F_o$, since the plunger 94 is maintained at the closed position as mentioned above, the force of the hydraulic fluid pressure $P_A$ urging the stepped diameter piston 38 leftwards in the drawing is in equilibrium with the forces of the hydraulic fluid pressures $P_f$ and $P_r$ urging the stepped diameter piston 38 rightwards in the drawing. The relationship of these forces is represented by the following equation:

$$P_f \cdot A_2 + P_r(A_1 - A_2) = P_A \cdot A_1 = F \qquad (6)$$

The values of the hydraulic fluid pressures $P_f$ and $P_r$ are determined by $A_2$, $(A_1 - A_2)$ and the pressure rigidities (hydraulic fluid pressure/volume) of the front and rear wheel braking systems. Assuming that by the displacement $\Delta S$ of the stepped diameter piston 38, hydraulic fluid $\Delta S \cdot A_2$ is delivered from the outlet opening 74 to the front wheel brake cylinders 16 and hydraulic fluid of $\Delta S(A_1 - A_2)$ is delivered from the outlet opening 72 to the rear wheel brake cylinders 14, and that the pressure rigidities of the front and rear wheel braking systems are $Q_f$ and $Q_r$ respectively, the following equations represent increases $\Delta P_f$ and $\Delta P_r$ in the hydraulic fluid pressures $P_f$ and $P_r$ by the displacement $\Delta S$ of the stepped diameter piston 38:

$$\Delta P_f = Q_f A_2 \cdot \Delta S$$

$$\Delta P_r = Q_r (A_1 - A_2) \cdot \Delta S$$

Accordingly, from these two equations $\Delta P_r / \Delta P_f$ is derived as $$\frac{\Delta P_r}{\Delta P_f} = \frac{Q_r}{Q_f} \cdot \frac{A_1 - A_2}{A_2} \qquad (7)$$

Previously measuring $Q_f$ and $Q_r$ and properly deciding $A_1$ and $A_2$ in accordance with $Q_f$ and $Q_r$, $\Delta P_r / \Delta P_f$ is below 1, that is, $$(\Delta P_r / \Delta P_f) < 1$$

Thus, the master cylinder 10 can prevent locking or skidding of the rear wheels similarly to a conventional master cylinder followed by a brake pressure proportioning valve or limiting valve.

With the master cylinder 10, the rate of increase in the front wheel braking pressure $P_f$ to increase in the brake pedal depressing force F when the brake pedal depressing force F is above the value $F_o$ is greater than the increase rate of the front wheel brake pressure $P_f$ when the brake pedal depressing force F is below the value $F_o$ in the following manner.

Modifying the equation (4) gives the following equation representing the increase rate of the front wheel brake pressure $P_f$ when the brake pedal depressing force F is below the value $F_o$:

$$P_f / F = 1 / A_1 \qquad (8)$$

Assuming $P_{Ao}$, $P_{ro}$ and $P_{fo}$ to be the hydraulic fluid pressures in the first, second and third hydraulic chambers 46, 48 and 50 respectively at the brake pedal depressing force $F_o$, putting the values $P_{Ao}$, $P_{ro}$, $P_{fo}$ and $F_o$ of $P_A$, $P_r$, $P_f$ and F in the equations (4) and (6) results in the following equation representing the equilibrium condition of the forces on the stepped diameter piston 38 at the instant the plunger 94 closes the passage means 101, that is, at the brake pedal depressing force $F_o$:

$$P_{fo} \cdot A_1 = P_{ro} \cdot A_1 = P_{Ao} \cdot A_1 = P_{fo} \cdot A_2 + P_{ro}(A_1 - A_2) = F_o \qquad (9)$$

In this state, when the brake pedal depressing force F is increased by a value $\Delta F$ so that the front and rear wheel brake pressures $P_f$ and $P_r$ are increased respectively by values $\Delta P_f$ and $\Delta P_r$, the following equation is obtained from the equation (6):

$$(P_{fo} + \Delta P_f) A_2 + (P_{ro} + \Delta P_r)(A_1 - A_2) = F_o + \Delta F \qquad (10)$$

Subtracting the equation (9) from the equation (10) gives $$\Delta F = \Delta P_f A_2 + \Delta P_r (A_1 - A_2) \qquad (11)$$

Therefore $$\frac{\Delta P_f}{\Delta F} = \frac{\Delta P_f}{\Delta P_f \cdot A_2 + \Delta P_r (A_1 - A_2)}$$

Therefore $$\frac{\Delta P_f}{\Delta F} = \frac{1}{A_2 + \frac{\Delta P_r}{\Delta P_f}(A_1 - A_2)} \qquad (12)$$

The equation (12) represents the increase rate of the front wheel brake pressure $P_f$ when the brake pedal depressing force F is above the value $F_o$. Subtracting the equation (8) from the equation (12) gives $$\frac{\Delta P_f}{\Delta F} - \frac{P_f}{F} = \frac{1}{A_2 + \frac{\Delta P_r}{\Delta P_f}(A_1 - A_2)} - \frac{1}{A_1}$$

$$= \frac{A_1 - \{A_2 + \frac{\Delta P_r}{\Delta P_f}(A_1 - A_2)\}}{A_1 \{A_2 + \frac{\Delta P_r}{\Delta P_f}(A_1 - A_2)\}}$$

$$= \frac{(A_1 - A_2)(1 - \frac{\Delta P_r}{\Delta P_f})}{A_1 \{A_2 + \frac{\Delta P_r}{\Delta P_f}(A_1 - A_2)\}}$$

Since $\Delta P_r / \Delta P_f$ is below 1 as mentioned above and $A_1 > A_2$, the terms $(1 - (\Delta P_r / \Delta P_f))$ and $(A_1 - A_2)$ are both positive. Accordingly, $$(\Delta P_f / \Delta F) - (P_f / F) > 0 \qquad (13)$$

Therefore, the increase rate of the front wheel brake pressure $P_f$ when the brake pedal depressing force F is above the value $F_o$ is greater than the increase rate of the front wheel brake pressure $P_f$ when the brake pedal depressing force F is below the value $F_o$.

Next, obtaining from the equation (11) the rate $\Delta P_r / \Delta F$ of increase in the rear wheel brake pressure $P_r$ to increase in the brake pedal depressing force F when the brake pedal depressing force F is above the value $F_o$, the increase rate $\Delta P_r / \Delta F$ is expressed as $$\frac{\Delta P_r}{\Delta F} = \frac{\Delta P_r}{\Delta P_f \cdot A_2 + \Delta P_r (A_1 - A_2)}$$

$$= \frac{1}{\frac{\Delta P_f}{\Delta P_r} A_2 + A_1 - A_2} \qquad (14)$$

Since $P_r/F = 1/A_1$ from the equation (4), subtracting the increase rate $P_r/F$ from $\Delta P_r/\Delta F$ gives $$\frac{\Delta P_r}{\Delta F} - \frac{P_r}{F} = \frac{1}{\frac{\Delta P_f}{\Delta P_r} A_2 + A_1 - A_2} - \frac{1}{A_1}$$

$$= \frac{A_1 - \frac{\Delta P_f}{\Delta P_r} A_2 - A_1 + A_2}{A_1\{A_1 + A_2(\frac{\Delta P_f}{\Delta P_r} - 1)\}}$$

$$= \frac{A_2(1 - \frac{\Delta P_f}{\Delta P_r})}{A_1\{A_1 + A_2(\frac{\Delta P_f}{\Delta P_r} - 1)\}}$$

Since $\Delta P_f/\Delta P_r$ is above 1 as mentioned above, the term $(1=(\Delta P_f/\Delta P_r))$ is negative. Therefore, $$\Delta P_r/\Delta F - P_r/F < 0 \qquad (15)$$

Accordingly, the increase rate of the rear wheel brake pressure $P_r$ when the brake pedal depressing force F is above the value $F_o$ is less than the increase rate of the rear wheel brake pressure $P_r$ when the brake pedal depressing force F is below the value $F_o$.

When a failure or malfunction occurs in the front wheel brake system so that no hydraulic fluid pressure is produced in the third hydraulic chamber 50, the plunger 94 opens the passage means 101 at all times. Accordingly, when the hydraulic fluid pressure $P_A$ is produced in the first hydraulic chamber 46 in response to depression of the brake pedal 12, the hydraulic fluid pressure $P_A$ moves the stepped diameter piston 38 to reduce the volume of the third hydraulic chamber 50 and is at the same time forced in the form of the rear wheel brake pressure $P_r$ to the rear wheel brake cylinders 14 by way of the passage 104, the space 102, the clearance 100 and the passage 106. In this instance, the rear wheel brake pressure $P_r$ satisfies the equation (4).

When a failure occurs in the rear wheel brake system so that hydraulic fluid in the second hydraulic chamber 48 or in both the first and second hydraulic chambers 46 and 48 escapes, the stepped diameter piston 38 is pushed by the spring 80 compressed in response to leftward movement of the power piston 34 by depression of the brake pedal 12. Similarly to when no failure occurs in the rear wheel brake system, the front wheel brake pressure $P_f$ is produced in the third hydraulic chamber 50 in accordance with a force pushing said stepped diameter piston 38, that is, the brake pedal depressing force F and is forced to the front wheel brake cylinders 16.

Figure 3:
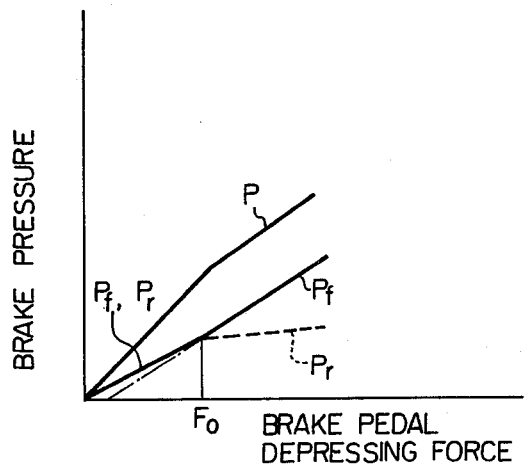
FIG. 3 is a graphic representation of the relationship between the front and rear wheel brake pressures and the brake pedal depressing force in the master cylinder shown in FIG. 1.

FIG. 3 is a graphic representation of the relationship between the front wheel brake pressure, the rear wheel brake pressure and the total vehicle braking pressure, as a function of the brake pedal depressing force, of the tandem master cylinder shown in FIG. 1. The front wheel brake pressure and the rear wheel brake pressure both increase in a proportional relation and are equal to each other as shown by the line $P_f$ and $P_r$ in FIG. 3 when the brake pedal depressing force F increases to the predetermined value $F_o$. The rear wheel brake pressure increases, when the brake pedal depressing force F is above the predetermined value $F_o$, at an increase rate smaller than the increase rate when the brake pedal depressing force is below the predetermined value $F_o$, as shown by the line $P_r$ in FIG. 3. The front wheel brake pressure increases, when the brake pedal depressing force F is above the predetermined value $F_o$, at an increase rate greater than the increase rate when the brake pedal depressing force F is below the predetermined value $F_o$, as shown by the line $P_f$ in FIG. 3. Such an increase in the increase rate of the front wheel brake pressure compensates for reduction in the increase rate of the rear wheel brake pressure. The total vehicle braking pressure shown by the line P in FIG. 3 can be proportional to the brake pedal depressing force.

It will be thus appreciated that the present master cylinder makes it unnecessary to dispose a brake pressure control device in a brake pressure supply circuit between a conventional master cylinder and brake cylinders so that the production cost is reduced and the piping simplified, and that the brake pressure control device eliminates the deficiency in the vehicle braking effect when the brake pedal depressing force F is above the predetermined value $F_o$.

What is claim is:

1. A master cylinder for an automotive vehicle having a brake pedal and front and rear sets of brake cylinders, comprising:

a housing having a blind stepped bore formed therein and a reservoir for hydraulic fluid in fluid communication with said stepped bore, said stepped bore having a large diameter bore section leading from the open end of said stepped bore and a small diameter portion leading from said large diameter bore section to the end wall of said stepped bore;

a first stepped piston slidably received in said stepped bore, said first piston having a small diameter portion and a large diameter portion;

a second piston slidably received in said large diameter bore portion and closing said stepped bore, said second piston being operatively connected to said brake pedal so as to be urged toward said first piston via pression of said brake pedal;

said first and second pistons defining in said stepped bore first, second and third variable volume chambers;

said first chamber being defined in said large diameter bore section between said first and second pistons;

said second chamber being defined in said large diameter bore section between the step of said first piston between said large and small diameter portions and the shoulder of said stepped bore between said large and small diameter sections; and said third chamber being defined in said small diameter bore section between the end of said stepped bore and the end of said small diameter portion of said first portion;

first and second biasing means disposed respectively in said large diameter bore portion between said first and second pistons and in said small diameter bore portion between said small diameter portion of said first piston and said end of said stepped bore;

passage means formed in said first piston for providing fluid communication between said first and second chambers; and valve means for obstructing said passage means to prevent fluid communication between said first and second chambers upon a pressure greater than a predetermined value prevailing in said third chamber.

2. A master cylinder as claimed in claim 1, further comprising second and third passage means for providing fluid communication respectively between said reservoir and said large diameter bore portion and said small diameter bore portion, said second and third passage means respectively communicating with said first and third chambers when the brake pedal is not depressed and isolated from said first and third chambers when the brake pedal is depressed beyond a predetermined amount.

3. A master cylinder as claimed in claim 1, wherein said second and third chambers fluidly communicate with said rear and front brake cylinders respectively.

* * * * *